United States Patent
O'Bryan et al.

(10) Patent No.: US 7,437,705 B1
(45) Date of Patent: Oct. 14, 2008

(54) SYSTEM AND METHOD FOR BUILDING AN APPLICATION ON A COMPUTING DEVICE WHICH INCLUDES AN ENVIRONMENT-CONTROLLING PROCESS

(75) Inventors: Dan Bradley O'Bryan, Kansas City, MO (US); Matthew Stropes, Lee's Summit, MO (US); Heather Vuong, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 613 days.

(21) Appl. No.: 10/729,258

(22) Filed: Dec. 5, 2003

(51) Int. Cl.
*G06F 9/44* (2006.01)

(52) U.S. Cl. .................. 717/100; 717/175; 717/176

(58) Field of Classification Search .............. 717/100, 717/175, 176
See application file for complete search history.

(56) References Cited

U.S. PATENT DOCUMENTS

| | | | |
|---|---|---|---|
| 6,195,796 B1 * | 2/2001 | Porter | 717/122 |
| 6,385,768 B1 | 5/2002 | Ziebell | |
| 6,457,170 B1 * | 9/2002 | Boehm et al. | 717/106 |
| 6,978,464 B1 * | 12/2005 | McDonald et al. | 719/319 |
| 6,986,135 B2 * | 1/2006 | Leathers et al. | 717/177 |
| 7,133,894 B2 * | 11/2006 | Banerjee et al. | 709/203 |
| 2004/0268344 A1 * | 12/2004 | Obilisetty | 717/175 |

OTHER PUBLICATIONS

Process Initation, Communication, and Management, COBOL85 Manual-134543, pp. 1-42.*

* cited by examiner

*Primary Examiner*—Tuan Q. Dam
*Assistant Examiner*—Andrew Chou

(57) ABSTRACT

Disclosed is a system and method of creating a build on a computer. The process involves special files which are checked into a version controlling system. One of these files includes only those parameters which are particular to the environment in the build is going to occur. This file may be edited by the programmer, enabling that programmer to configure the application for different environments. These environmental configurations by simply editing the environmental file on the first computing device, and these changes will later be propagated to all the server classes in the second computing device that make up the application.

25 Claims, 5 Drawing Sheets

SYSTEM AND METHOD FOR BUILDING AN APPLICATION ON A COMPUTING DEVICE WHICH INCLUDES AN ENVIRONMENT-CONTROLLING PROCESS

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

The present invention relates to the process of creating a build on a computing device. More specifically, the present invention involves the use of files that are checked out of a version control system. These files enable the user to control server class configurations in the computing device from a file on a PC. The files enable the user to dynamically configure server classes with respect to the particular environment in which it is desired that the server class run in, and delete previous server-class configurations in order that corruption, which might be due to preexisting server classes in the pathway, is prevented.

2. Description of the Related Art

Version control systems, also known as source control tools, are a component of configuration management. The purpose for these tools is to enable a computer programmer to take a "snapshot" of a development process to be recovered at some stage in the future. Recovery of the snapshot usually occurs when computer program application development has moved on past the snapshot time.

If a source control tool is not used, and software is released for use in the field without maintaining a version, problems may arise when later software releases are made. If the program with the later release contains a bug that prevents the software from being useable, without the use of a version controlling system, there is no way to recover specifically which version in which the bug exists.

Bugs usually develop at the point that software is modified. Oftentimes the bug is not recognized until long after the modification is made. Therefore, version control tools enable programmers to easily retrieve old versions to see the point and time at which the bug entered the application's development.

One common version control system known to those skilled in the art is known as "CVS." CVS stores all of the versions of each file which comprises an application. This is done, however, in a manner in which only the differences between the versions of each file are stored. If a number of different programmers are working on the same application, it is very easy for different programmers to overwrite the changes of another programmer unless extreme caution is taken. CVS overcomes this problem by isolating the different application developers by a wall. Each of the programmers works in his or her own directory, and afterwards CVS combines all of the changes made by all of the developers when each of them finishes work.

The place at which CVS maintains all of the changes to the application is referred to as a repository. When a programmer works on an application, working files are checked out of the repository. When the programmer is finished, the changes are checked back in. The repository then includes all the changes the programmer has made. It has also recorded when the changes were made.

Though these widely used source control tools of the prior art have proved to be apt for version controlling a number of NT workstations. There is presently, however, no way to adequately version control applications when they are built onto a larger type of computer. One example of such a computer is what is known as and commercially available as a Tandem™.

These types of larger computing devices may have a number of servers which accomplish its computing functions. They may also have a number of controlling processes, each of which manages a particular environment therein. With respect to the Tandem™, a Pathmon™ process, or a "pathway" is a controller for a particular environment.

Before the present invention, there was no way to ensure that applications being tested on a Tandem™ could be easily rebuilt—that the computing objects could be built from scratch—and that the objects being tested were kept up to date at all times.

Conventionally, one using a PC or in an NT network would have difficulty generating a build from CVS onto a Tandem. This process would involve manually checking the version out of CVS using a tag. After the version of the application was drawn out of CVS onto the PC, it would have to be manually transmitted to the Tandem using a File Transfer Protocol (FTP). Once on the Tandem, the process controller for the particular environment would have to be manually programmed to build the application in a directory on the Tandem. This involves transmitting updates into the process controller. This updates method is problematic, because there will be no guarantee that you can build the application again from scratch. You will not have the assurance that you can rebuild it if you have to. Additionally, knowledge of the vintage server classes will be retained, which would be problematic. If we end the development cycle on a particular application and then later on decide to expand on it, and all our environments are gone, then we will be precluded from rebuilding the application from the ground up. Additionally, this conventional process is very time consuming and labor intensive.

With the prior art techniques, environments were driven off of a process controller in the second computing device. The controller on the second computing device was given an ID. That ID was then used to set up specific environments.

Conventionally, the process controller (e.g., Pathmon™) on the Tandem™ contained the server class configurations. You would dump these configurations out onto a file, however, that file has established configurations for the particular environment in which its server class exists. In order to move it to a new environment, you would have to manually change the file so that you could make it work in another environment. This would involve reloading and testing the file to make sure that your changes were correct. This is a difficult thing to do, because there is nothing in the file that indicates which items are environmentally dependent, and which items are not. Thus, the programmer would have to painstakingly search and sort.

Additionally, this conventional method involves rebuilding the application one server class at a time. This involved recoding a file for every server class rebuilt, which is time consuming and very detail sensitive.

Another disadvantage in the prior art methods of building applications onto the large computer involves a lack of adaptability. Working on separate instances of the application in separate environments may become problematic where both instances are writing or working with the same set of tables.

SUMMARY OF THE INVENTION

The processes of the present invention overcome this deficiency in the prior art source control systems. It ensures that a programmer can be confident that the code pulled out of a source control tool may be built on the large computing device with the current configurations, or the configurations of a particular version of the application. The code is generated using editing software on a first computing device, such as a PC, but stored on a second computing device, e.g., a Tandem™, using means which enables the PC to have file access to the directory in the second computing device, e.g., Samba™. Then it is checked into the version control system along with files that include the appropriate environmental configurations for the particular environment in the second computing device into which the application is to be built. A particular version of the application is then selected on the first computing device (PC) using a conventional source control tool. It is then checked out to a directory on the second computing device (Tandem™). The application is then built on a second computing device. The second computing device (Tandem™), in one embodiment, has a controller, such as a Pathmon™ process. Substantially all server classes associated with the application are then located on the pathway of the second computing device, stopped, and then deleted. The selected version of the application is then built into an environment in the second computing device.

The process of the invention enables the user to (i) control server class configurations in the second computing device from a file on the PC; (ii) dynamically configure the server classes with respect to the particular environment in which it is desired that the server class run in; and (iii) delete previous server-class configurations in order that corruption, which might be due to preexisting server classes in the pathway, is prevented.

Applicant has accomplished these objectives by developing a file which is checked into the version controlling system along with the rest of the application. It contains only parameters which are particular to the environment in the second computing device. This file may be edited by the programmer. This enables the programmer to change the environmental configurations by simply editing the environmental file on the first computing device, and these changes will later be propagated to all the server classes in the second computing device that make up the application.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1:
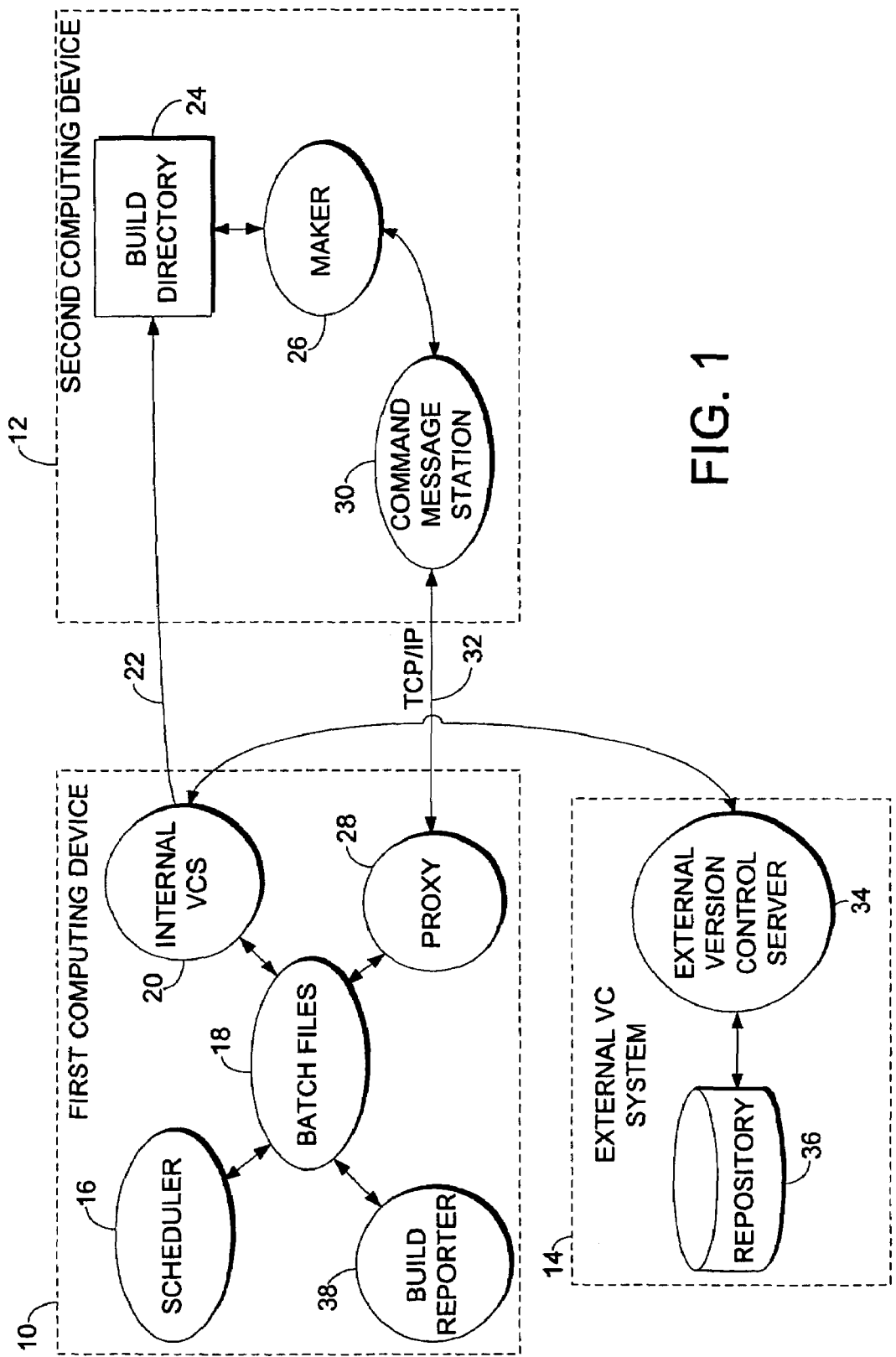
FIG. 1 is a schematic showing the components employed in the build process of the present invention.

The present invention provides a system and method for using a version control tool for building an application from one computing device onto a second computing device. The process involves the use of environmental configurations for the second computing device. These environmental configurations are checked into the version control tool along with the rest of the application. When a scheduled build is compiled on the second computing device, scripts are used to employ the environmental configurations to configure servers in the second computing device.

Programmers will check things into the CVS repository that have been proven to work. Unverified things, potentially including bugs, will not be checked in to the repository, and thus not automatically rebuilt. Builds may be done on a scheduled basis. In one embodiment of the invention, the builds are done from a branch tag. This enables the users to constantly get the newest code for the particular area in which programmers are developing. This provides numerous advantages not present in the prior art:

One advantage provided is that this process makes it easier to identify defects. Every interval in which the rebuild process is performed, users will be able to determine if bugs exist in the code. This the code will only be able to be built if there is no error that prevents it from compiling. If the application was not rebuilt with the newest code (which is known to be functional) programmers would not be able to determine if the developed code is what caused the compiling error (the bug), or if the bug was present in the pre-existing code. When rebuilding occurs on a schedule, the users will know there is a problem, e.g., nightly because it will not compile overnight. It will then become apparent that some defect need be corrected.

A second advantage is that the process of the present invention keeps the application on the second computing device up to date at all times. According to one embodiment of the method, the rebuilds are performed daily. A predetermined interval, or intervals are ideal because they will refresh the code on a dependable schedule. This is especially advantageous when programmers are testing. For example, if you are testing some newly developed parts of the code to see if it works, you want to make sure that the rest of the application remains the same day in and day out. Thus, when programmers encounter compile errors, they may be sure that it is due to recent development. Debugging efforts, thus, may be focused on the newly developed code only.

A third advantage is that the process of the present invention enables the code to be automatically rebuilt in numerous environments because of its dynamic configuration generating functions. The dynamic aspect of the present invention is due to environmental configuration generating files which are checked in, and then maintained along with the tagged version in CVS. The additions of server classes into a controller in the mainframe enables the application to dynamically adapt independent of the parameters of a particular environment. If the user is required to manually creating files in the second computing device every time it is desired to build the application into a particular environment, time is wasted. The environmental configuration generating files, when pulled out of the version control system, enable the application to dynamically adapt to the environment. Because of this, multiple test environments may be run simultaneously because the configuration adapting files enable the build to automatically adapt to the environment.

Various technical terms are used throughout this description. A definition of such terms can be found in *Newton's Telecom Dictionary* by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed the meaning of the words offered in the above-cited reference. For example, whereas some distinguish the World Wide Web (WWW) as a subcomponent of the Internet, "web"—as used herein—should not be construed as limited to the WWW. Rather, "web" is intended to refer generally to the Internet and/or is related subnetworks and subcomponents.

As one skilled in the art will appreciate, the present invention may be embodied as, among other things: a method, system or combination of systems, or a computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

The components used to accomplish the repeat build process of the present invention are shown in FIG. 1. Referring to the figure, we see that the system comprises a first computing device 10, a second computing device 12, and an external version storage system 14.

First computing device 10 may be any sort of computing device capable of supporting version controlling software thereon. For example, device 10 might be a personal computer. It also might be included in a network of personal computers. In the embodiment shown in FIG. 1, a standard NT workstation is used which operates on an SMB protocol. It will be apparent to one skilled in the art, however, that numerous kinds of computing devices could be used and still fall within the scope of this invention. It may also be seen that first computing device 10 includes numerous components.

One of these components is a scheduler 16. Scheduler 16 is a computer program designed to perform scheduling functions, such as the initiation or termination of jobs. In the embodiment shown in FIG. 1, an NT scheduler has been used. Other types of scheduling programs or other techniques will be known to those skilled in the art and would also fall within the scope of the invention here.

Scheduler 16 is used to initiate batch files 18 at a specified time, or on a predetermined schedule. The batch files 18 will be activated to accomplish a build on the second computing device 12. Batch files are files that contain a series of commands which are to be processed in sequence. Here, the batch files 18 are used to initiate builds of an application on second computing device 12. These batch files 18 are initiated by scheduler 16. Scheduler 16 may be set to cause the execution of the batch files upon the expiration of a particular amount of time—at a particular interval. In the present embodiment, scheduler 16 initiates these builds nightly. Because of the repeat nature of these builds, they will hereinafter also occasionally be referred to as rebuilds. Other intervals could of course be used. Additionally, it may also be desirable to initiate builds on demand at no particular predetermined time. Accomplishing execution at any particular interval or on demand may all be done in a manner that is well known to those skilled in the art and thus, the invention is not to be considered limited to any particular build-initiation methodology.

Information regarding builds which have been initiated and completed may be communicated to a project manager, or other entity, by way of email or other means by way of a build reporter 38. There are many ways which will be known to those skilled in the art of reporting information regarding builds from the batch files 18. The technique employed here is to use a simple java-controlled SMTP client to send an e-mail. These emails will enable information regarding builds to be made available to any interested individual, e.g., a project manager.

Also included in first computing device 10 is an internal version control server 20. Internal version control server 20 is simply a form of version controlling software that is installed on device 10. Version control software applications are also often referred to as source control tools. The particular version control program used here is widely used and known as "CVS."

CVS is used to record the history of source files. Sometimes bugs enter into source code when a program is modified in development. Significant time, however, might elapse between when the bug-infested modification is made and when the bug is actually discovered. With CVS, the user is able to go back in time and determine which version of the code created the bug. This can assist the programmers in many ways. Especially when a group of programmers are working together simultaneously in developing or testing the same application. It is easy for one programmer to overwrite the changes made by another. CVS solves this problem by insulating different developers. Each developer works from a different device 10 into a different directory from one another. CVS then merges the work when each developer is done.

The components of some version control systems are completely internal to first computing device 10. Such arrangements, in which a repository is maintained on the same, or another personal computer, could also be used with the present invention. In the FIG. 1 embodiment, however, uses the more common arrangement wherein an external version control storage system 14 includes an external version control server 34 and a cooperating repository 36. In such an arrangement, numerous first computing devices (work stations) my utilize the same storage system 14 for version-control purposes. In such an arrangement, server 34 receives or sends files from an internal version control server 20. With each new version that is checked in to the version control repository 36, a tag is assigned which will later enable a user to identify a particular version of an application. Server 34 stores new versions of applications in repository 36 along with the assigned tag. Versions may also be withdrawn from repository 36 by first computing device 10 by referencing the tag. All of this is known technology. Reference may be made to *Version Management With CVS* by Cederqvist et al. (2003) for more information on CVS systems and how they operate.

One aspect of the present invention is that additional files are checked into along with a properly functioning version of the application which is to be built on the second computing device. In the preferred embodiment, the version of the application will comprise two XML files and a number of XSL files. More specifically, the application will include: (i) a first XML file including environmental configuration generating scripts designed to run in at least one process on the second computing device, (ii) a second XML file including the objects of the application which makes reference to the environmental XML file, and (iii) a number of XSL files. A block diagram showing these features is disclosed in FIG. 3.

All of these files are checked into the version control system's repository 36 with an appropriate tag for identification purposes. The tag will later be used to call up this particular version of the application.

The nature of XML files in general will be well known to those skilled in the art. Such files are designed to deliver information over the Web or some other protocol. They do not comprise a computer language per se, rather, they include a way of defining languages that are developed along its general principles. The XML files of FIG. 3 fall within these general characteristics.

With respect to the two kinds of XML files used here, object-XML file 204 includes information on what a group of executables need in order to run—not the specifics regarding the environmental parameters. Though object-XML file 204 contains no environmentally-specific parameters, it does make reference to the environmental XML file (which contains these parameters) in order to make the application work. One embodiment of such an object-XML file is disclosed at the end of this specification before the claims.

Figure 4:
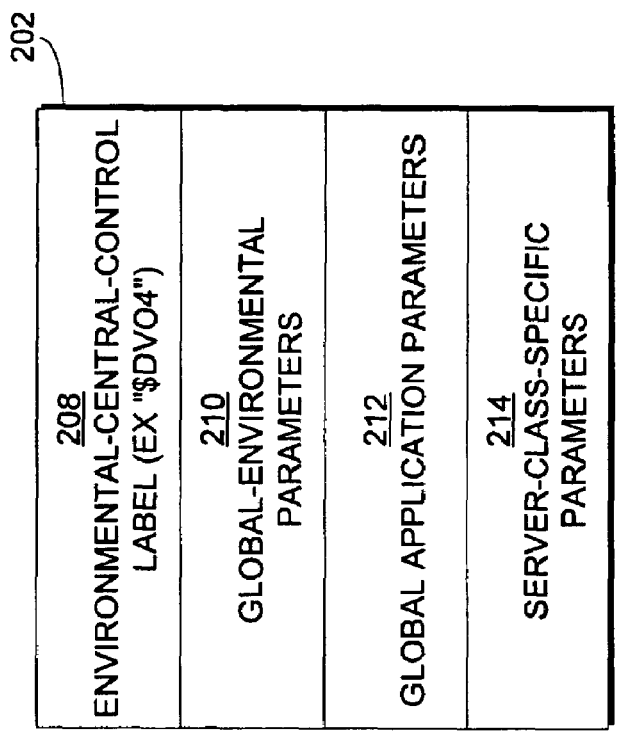
FIG. 4 shows the contents of the environmental-configuration-containing XML file.

Environmental-XML file 202 contains the environmental-specific configurations of the application. As may be seen in FIG. 4, the environmental-XML file 202 includes: (i) an environmental-control label 208; (ii) a group of global environmental parameters 210 that are specific to the environment, but not specific to that particular application; (iii) a group of application parameters 212 that are specific to that particular environment; and (iv) a number of server-class-specific parameters 214 which, when edited allow configuration-changes specific to particular server classes. One embodiment of such an environmental-XML file is disclosed at the end of this specification before the claims.

The information in the object-XML file 204 and environmental-XML 202 file enables adaptation to a particular environment having particular parameters dynamically. Because of this, new configurations need not be developed every time the application is built on the second computing device. The environmental-XML file 202 is available to whomever is running the environment. Using it, a programmer sets the environmentally-specific parameters 210 to do whatever is desired and needed for that specific environment. This automates the rebuild process, because gives the user great flexibility because they will not have to reconfigure the environmental parameters to rebuild the application.

Additionally, configuration generating scripts in the environmental XML file are used to allow the user to create an environment in the second computing device. Scripts are essentially a series of pre-programmed steps including pre-conceived answers to sequences of anticipated prompts.

These scripts work through a command interface, e.g. Pathcom™ (not shown), that is provided into a control process in the second computing device in order to allow the creation of or changes in environmental parameters. More will be described of this later.

The XSL files 206 contain a language which is used to transform XML-based data into HTML or other presentation formats, for display in a web browser. The transformation of XML into formats, such as HTML, is done in a declarative way, making it easier and more accessible. XSL uses XML as its syntax, freeing XML authors from having to learn another markup language. Here, as is common place, the XSL files contain a series of commands that are basic generic utilities. These commands will typically not change from application to application and will typically be included with every XML-based application.

Turning now back to the remaining components of first computing device 10, we can see in FIG. 1, the device includes a proxy server 28. Proxy server 28 is a software application that enables device 10 to send and receive messages over the Internet. It is used in the FIG. 1 arrangement to accomplish command communications between devices 10 and 12 though a peer-to-peer connection 32. In the preferred embodiment, this is a TCP/IP (Transmission Control Protocol/Internet Protocol) connection 32. These build-related communications are used to accomplish a build on the second computing device 12 in a manner that will be explained hereinafter.

Second computing device 12 could be the same or a different type of computing device from first computing device 10. In the embodiment disclosed in FIG. 1, however, the second computing device is a larger-type of computer. Even more specifically, device 12 is a Tandem™, the software and hardware for which are available from Hewlett-Packard, Inc. The operating system of the Tandem™, in this embodiment, is run on OSS. The Tandem™, however, could be operated on Gaurdian™ or some other type-system. Other kinds of computing devices and different kinds of operating systems could, of course, be used to comprise second computing device 12 and would still fall within the scope of the present invention. For example, other computers operated on Unix or Windows™ or other systems could be used as well in manners that fall well within the scope of the present invention.

Turning now to the specifics regarding the components of second computing device 12, we see it includes therein a masquerading drive 22. Masquerading drive 22 is a process that, when installed causes second computing device 12 to appear as a drive on first computing device 10. As one part of the present invention, devices 10 and 12 may work on operating systems that communicate using different types of protocols. For example, in the FIG. 1 embodiment of the present invention, the operating system for first computing device 10 speaks the SMB (Server Message Block) protocol. Also in the FIG. 1 embodiment, second computing device 12 may operate on some based on Unix or OSS. Masquerading drive 22 enables second computing device 12 to be accessed for building purposes as if it were included on the network of first computing devices 10. Thus, source code by be developed on second device 12 from first device 10.

In the embodiment shown in FIG. 1, the masquerading drive 22 is a Samba™ drive. Samba™ is a well known product readily available off the shelf which is able to enable bring a Unix or Unix-like machines onto an SMB-based network. Here it is used to give file access to the second computing device 12. Other arrangements, of course, might work equally as will and would fall within the scope of the present invention.

Masquerading drive 22 enables the build to be made into build directory 24. Directory 24 is the directory into which the objects are to be deployed in the second computing device.

These objects are built into directory 24 using a maker 26. Maker 26 is a software tool that is used to generate executables and other non-source files of a program from the program's source files, which are transmitted to the second computing device 12 from version control server 20 of first computing device 10. Maker 26 gets its knowledge of how to build the program from a special file which lists each of the non-source files and contains information on how to compute it from other files. In the FIG. 1 embodiment of the present invention, maker 26 is a commercially available program called "GNU Make," also known as "gmake" or "Make." The special file referred to above is called a "makefile" when GNU Make is used. GNU Make is well known in the art. And one familiar with GNU Make is familiar with how it may be used within an arrangement like that shown in FIG. 1 to build an application into a directory like directory 24.

Second computing device 12 receives and sends build information from and to first computing device 10 from maker 26 using a command message station 30. In the FIG. 1 embodiment, command message station 30 is a command hublet. A command hublet is able to be run on a Tandem™ computing device. It is a software application that is able to receive the messages from the first computing device telling the maker 26 to start the building of the application. It also returns information regarding the build to the first computing device via the TCP/IP connection 32.

Though a TCP/IP connection 32 is used in the FIG. 1 embodiment, other means supporting peer-to-peer or other networking means for allowing connectivity functions known to those skilled in the art could be used as well.

Now that the various components of the embodiment disclosed in FIG. 1 have been described, we may discuss how all of these components work together to kick off a build on the second computing device 12 using the first computing device 10. To start, scheduler 16 is typically set to trigger the batch files 18 at a predetermined time to initiate a build. Sometimes at regular intervals. In one embodiment, the builds occur nightly. In other embodiments, no scheduler would be used and the batch processes 18 would be kicked off at only one specific time, or manually by other means known to those skilled in the art. Regardless, once the batch files 18 are initiated—either by the scheduler or manually—the build begins.

In the build process, the batch files 18 contain a series of commands which are processed in sequence to cause internal version control server 20 to recall a particular version of the application using a tag. Scripts have been written that execute on the platform of the first computing device 10 which allow it to get the latest, or other desired version, of code out of the version control system. In the embodiment disclosed in FIG. 1, the internal version control server 20 uses the tag to draw the desired version of the application from the repository 36 in the external version control system 14 using server 34 in a manner known to those skilled in the art.

In one embodiment Once the application, comprising the XML environmental, XML object, and XSL files have been retrieved from the version control system, they are given file access to, and then deployed into directory 24 on the second computing device using masquerading drive 22.

The commands necessary for deployment are directed to the second computing device from the first computing device through a line of communications comprising proxy server 28, TCP/IP connection 32, and command message station 30. This line of communications is used by the process as follows.

First, the initiating commands originate from the processing batch files 18. Next, they are transmitted, via TCP/IP connection 32, to the command message station 30 in second computing device 12.

Once the commands to kick off the build are received in station 30 in the second computing device, command message station 30 gives maker 26 the instructions necessary to begin the build within directory 24.

At this point, the configuration generating scripts in environmental-XML file 202 generate the configurations necessary to build the application into a particular environment on the second computing device 12.

Figure 2:
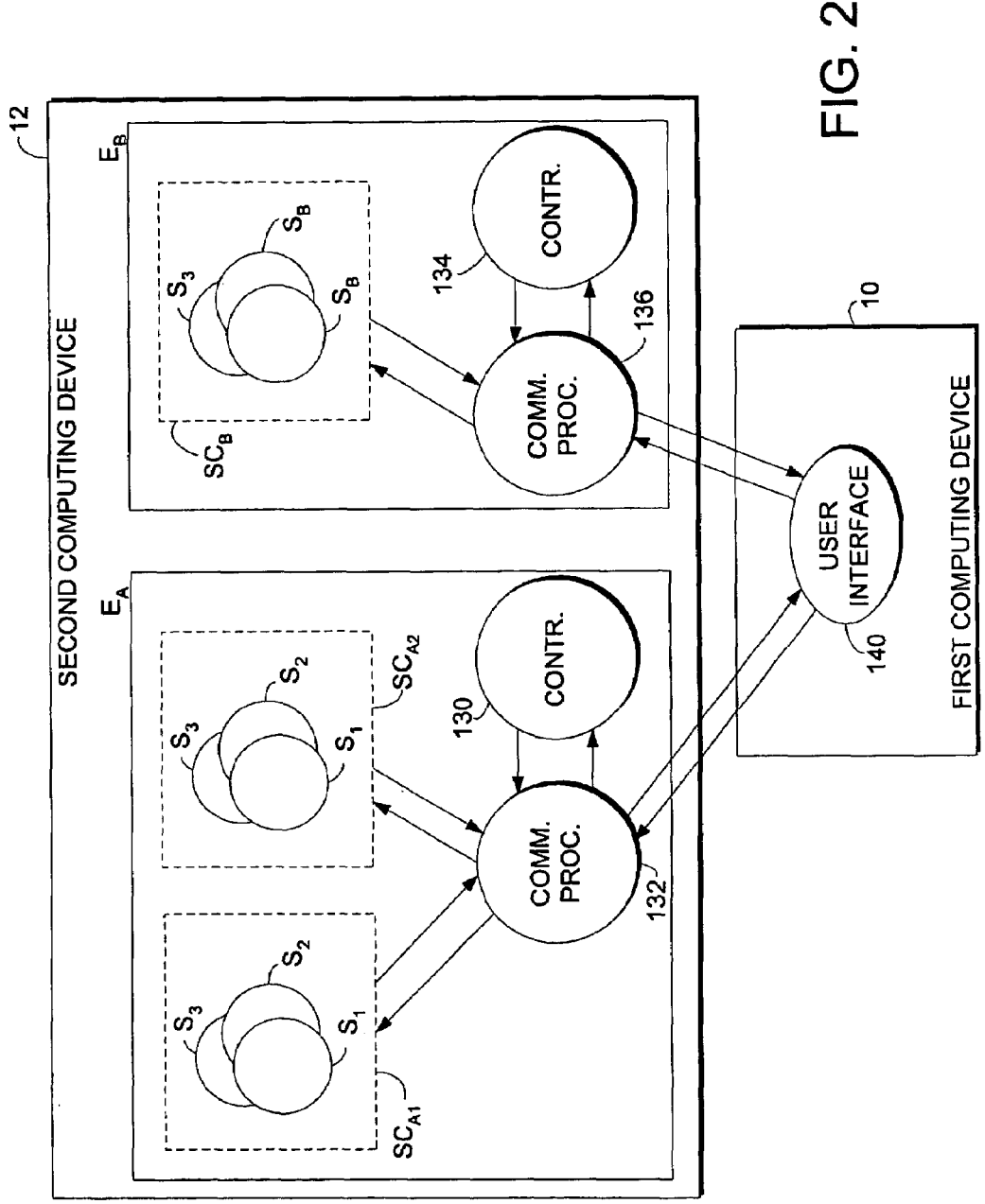
FIG. 2 is a schematic showing the different processes existent on the second computing device and how these processes may be accessed/activated using the first computing device.

FIG. 2 shows the processes which may exist on a typical second computing device. In this figure, two different environments, $E_A$ and $E_B$. An environment is a set of servers, server classes, TCP's, terminals, and messaging systems that operate under one controlling process. Though only two environments are shown in FIG. 2, the second computing device should not be considered as limited to having only two environments operating therein. The figure has been adapted as such for simplicity. Most second computing devices would have numerous environments running simultaneously. One example of an environment used on a Tandem, e.g., is what is referred to as a PATHMON environment, which will be known to one skilled in the art, and is the kind of environment shown in the FIG. 2 embodiment. Other similar processes, however, exist which would fall within the scope of the present invention.

The operation of second computing device 12 is dependent on the support of multiple servers. A "server" as used here, means simply a process that receives, and may also send, messages. Servers are used, practically speaking, to provide operations for requesters by reciprocal messaging. Environment $E_A$ has two server classes, $SC_{A1}$ and $SC_{A2}$. Each of these server classes $SC_{A1}$ and $SC_{A2}$ include three servers, $S_1$, $S_2$, and $S_3$. Each server is one process of a particular application. Each server class may include numerous servers, each of these servers running the same executable of an application at the same time. Accordingly, each of servers $S_1$, $S_2$, and $S_3$ falling within the same server classes will run the same executable. These identical $S_1$, $S_2$, and $S_3$ executables are all running simultaneously, but in response to different requests.

Each of the servers created within a particular server class are configured through a controller. With respect to FIG. 2's environment $E_A$, a controller 130 is shown. It may also be seen that controller 130 operates though a communications process 132. Communications process 132 may be any communications protocol, i.e., the internet. Controller 130 is a process in environment $E_A$ that (i) maintains configuration-related information, (ii) grants links to server classes in response to requests; and (iii) performs all process control (e.g., starting, monitoring, restarting, and stopping) of server processes and TCP's. It is in essence, what makes the environment exist, and function.

A controller operates with respect to the server classes as a process/server messaging manager. It allows you a clean slate that allows you to set up whatever environmental parameters are important to the application.

It is also a load balancing tool. When a message comes in through a user interface, it picks the particular instance of the server—the particular process—to talk to based on how busy the different processes (servers) are. Because, e.g., all of the servers $S_1$, $S_2$, and $S_3$ in server class $SC_{A1}$ are capable of running the same executable, the controller looks for the running process/server that is not currently sending or receiving a message for use. If no processes are running on a particular server, the controller will start a process up in order to fulfill the request. It may be seen that all the server classes shown in FIGS. 2, 5, and 6 include three servers each. This number is only illustrative in nature. It is well known that a server class may contain as many or few server classes as is desired for a particular objective. Here, three has been chosen as a manageable number only and is not intended to be in any way limiting.

One example of a controller which may be used in the second computing device is what is known commercially as the Pathmon™ process, or a "pathway." Pathmon™ is software application that is run on a Tandem™ (a large computer). Both the software and computer are manufactured by Hewlett-Packard, Inc.

In the embodiment of the invention disclosed in FIG. 2, controller 130 is this Pathmon™ process. As can be seen in FIG. 2, controller 130 is used to control server classes $SC_{A1}$ and $SC_{A2}$ through communications controller 132.

Environment $E_B$ is structured essentially the same as is environment $E_A$. Like environment $E_A$, environment $E_B$ has three servers, $S_{B1}$, $S_{B2}$, and $S_{B3}$. Each of these servers are shown within a server class $SC_B$. Like server class $SC_A$, server class $SC_B$ is created through and managed by controller 134. Controller 134, like controller 130, is a process in environment $E_B$ that maintains configurations, links server classes, and controls all server processes in environment $E_B$. Controller 134 accesses server class $E_B$ through a communications controller 136.

Though the $E_B$ environmental arrangement is identical to the environment $E_A$ arrangement, the two environments would typically be subject to different parameters requiring different configurations. Here, environment $E_A$ and $E_B$ are test environments. Alternatively, however, environment $E_A$ may be a test environment whereas environment $E_B$ is adapted and used for development. Yet a third environment (not shown) might be devoted to production. There may also be multiple test, development, and/or production environments for the same application on the second computing device—all requiring different parameters (e.g., web servers, directory pathways). The actual type of environment or number of environments are not a limitation on the processes of the present invention. It is significant, however, to note that each environment has different environmental parameters that must be met. Primarily what is meant by the phrase "different environment" is that the application is subject to a different set of data tables. However, there are other types of environmental parameters, such as the directories, server classes, and/or websites that are to be referenced.

The reasons for creating different environments for the same application are numerous. One example of why this is done is so that concurrent development of the same application may be done in multiple regions. For example, oftentimes an application that is being developed becomes excessively complicated. One group of programmers may decide to develop or test a portion, or branch, of the application. A second group of developers may be simultaneously working on another branch of the application. To enable concurrent testing by the two different groups of programmers, different environments are set up for each group of programmers so that they are able to work with concurrently running versions of the same application.

Each of controllers 130 and 134, and thus environments $E_A$ and $E_B$, are associated with a recognizable label, which is recognized by the controller in that environment. For example, controller 130 may respond to a label "$DVO4." When $DVO4 is referenced, it is recognized by controller 130, and it is known that the environment $E_A$ is being prompted. Controller 134 would have a different identifier, e.g., "$DVO5." By referencing this different label, controller 134 will be prompted for controlling the processes in environment $E_B$. This is how different environments can be accessed/created.

Controller 130 of environment $E_A$, and controller 134 of environment $E_B$ may both be accessed from first computing device 10 through a user interface 140. Interfacing between first computing device 10 and second computing device 12 may be accomplished in any way known to those skilled in the art. In the FIG. 2 embodiment, however, first computing device 10 and second computing device 12 may have different system architectures and possibly even different operating systems. Under these circumstances, the user interface should be able to convert the code developed on the first computing device such that it can be recognized on the second computing device. In order to accomplish this, common interfaces through which object-oriented software on the first computing device can communicate with the processes on the second computing device, regardless of the possibly different platforms there between. Here, the interfacing is accomplished using what is known as Common Object Request Broker Architecture, or "CORBA." Using CORBA, application components on the first computing device can communicate with application components on the second computing device—regardless of the differences between the two systems.

Figure 3:
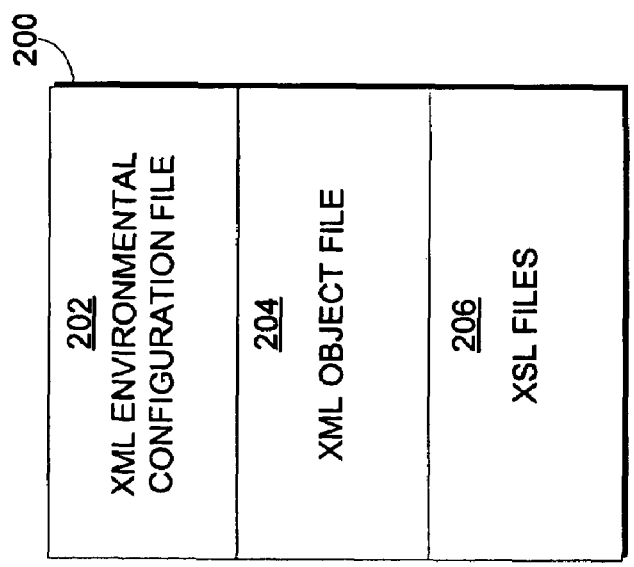
FIG. 3 shows the XML and XSL files which are checked into the version control system and comprise the application.

The details of how the three groups of files shown in FIG. 3: (i) the object-XML file 204 which include the objects of the application; (ii) the environmentally-specific XML file 202 which includes the environmental configuration generating scripts designed to run on second computing device 12; and (iii) the XSL files 206 are used in accomplishing the present invention will now be discussed.

Object file 204 include information on what a group of executables need in order to run.

In many ways, the XML object 204 and XML environmental 202 files work together. Object file 204 may reference environmental file 202 to obtain the environmental parameters it needs to work in a particular environment. It does not, however, contain things that are tied to a particular environment. It only configures the things that are not environmentally specific. It references only items that it needs which are common to all the server classes—not things specific to particular server classes. Thus, object file 204 will not have to be changed when you go from environment to environment.

Environmental file 202 includes configurations for the particular environment and server classes into which the application is being deployed. Every server class has some parameters that are common to all of the other server classes. Other parameters will be different. These different environmentally-sensitive parameters are what will be maintained in environmental file 202.

This separation of things environmentally specific versus those things that are non-environmentally-specific between the two XML files is what makes the application dynamically adaptable to different environments. Because of this, new configurations need not be developed every time the application is built on the second computing device. This file is available to whomever is running the environment to be edited to set the parameters to do whatever is desired. This automates the rebuild process, because gives the user great flexibility because they will not have to reconfigure the environmental parameters to rebuild the application. Configuration generating scripts in the environmental XML file are used to allow the user to create an environment in the second computing device.

Using these scripts, the user is able to automatically institute series of commands that would normally have to be manually entered. Its programmed answers to sequences of anticipated prompts generates the configuration-generating commands automatically so the user doesn't have to.

These scripts work through a command interface, e.g. Pathcom™ (not shown), that is provided into a control process in the second computing device in order to allow the creation of, or changes in environmental parameters. The scripts in the environmental-XML file are encoded to do this.

It will now be discussed in detail how these configuration generating scripts in environmental file 202 are used to accomplish a process of the present invention.

First, the scripts issue a first command through the command interface, e.g. Pathcom™, which stops all the server classes running in the particular environment into which the application is desired to be disposed. This command is received through communication process 132 and given to controller 130. Controller 130 then stops all the server classes.

Figure 5:
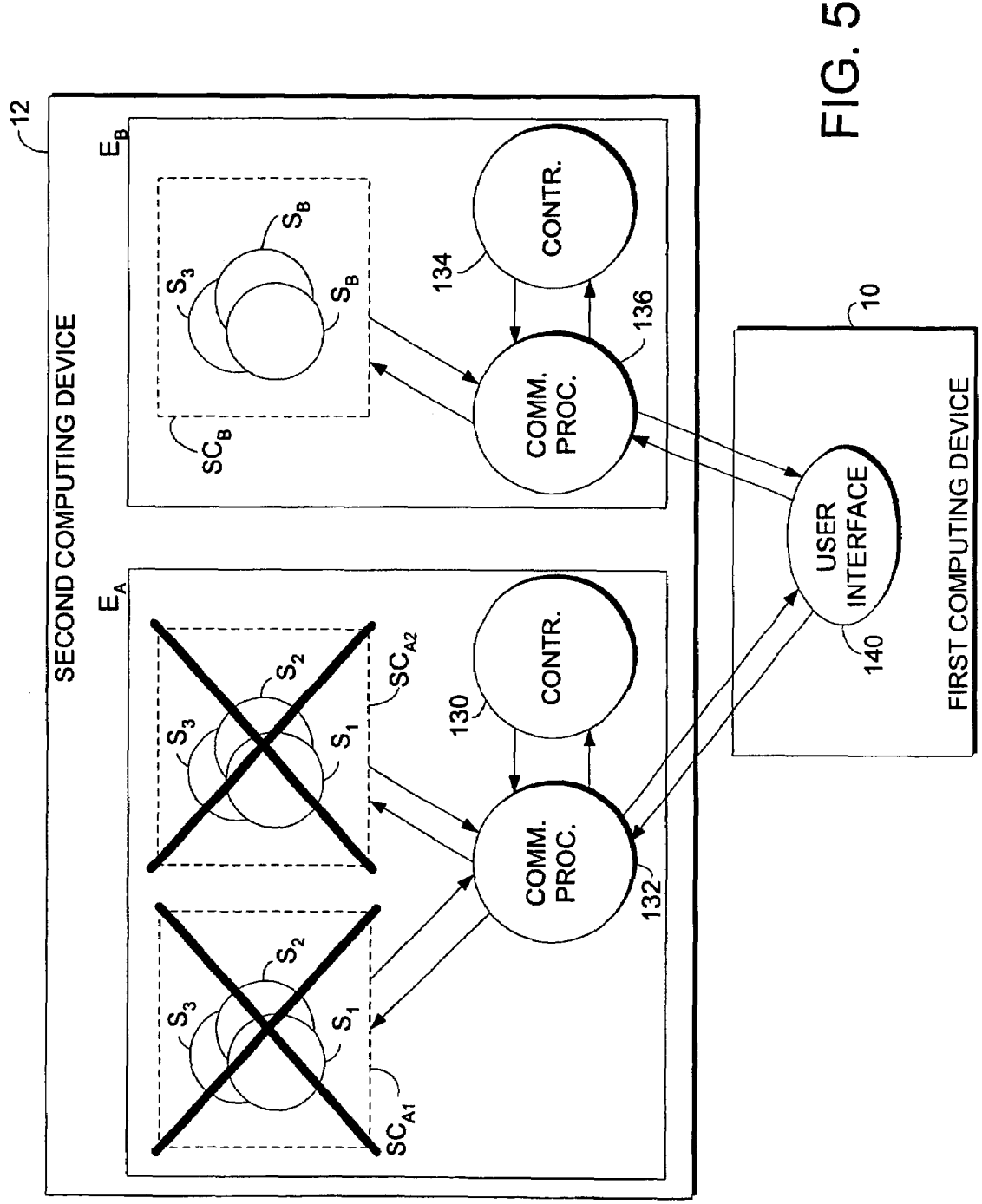
FIG. 5 shows the step in the process of the present invention in which all of the server classes in a particular environment in the second computing device are deleted.
Figure 6:
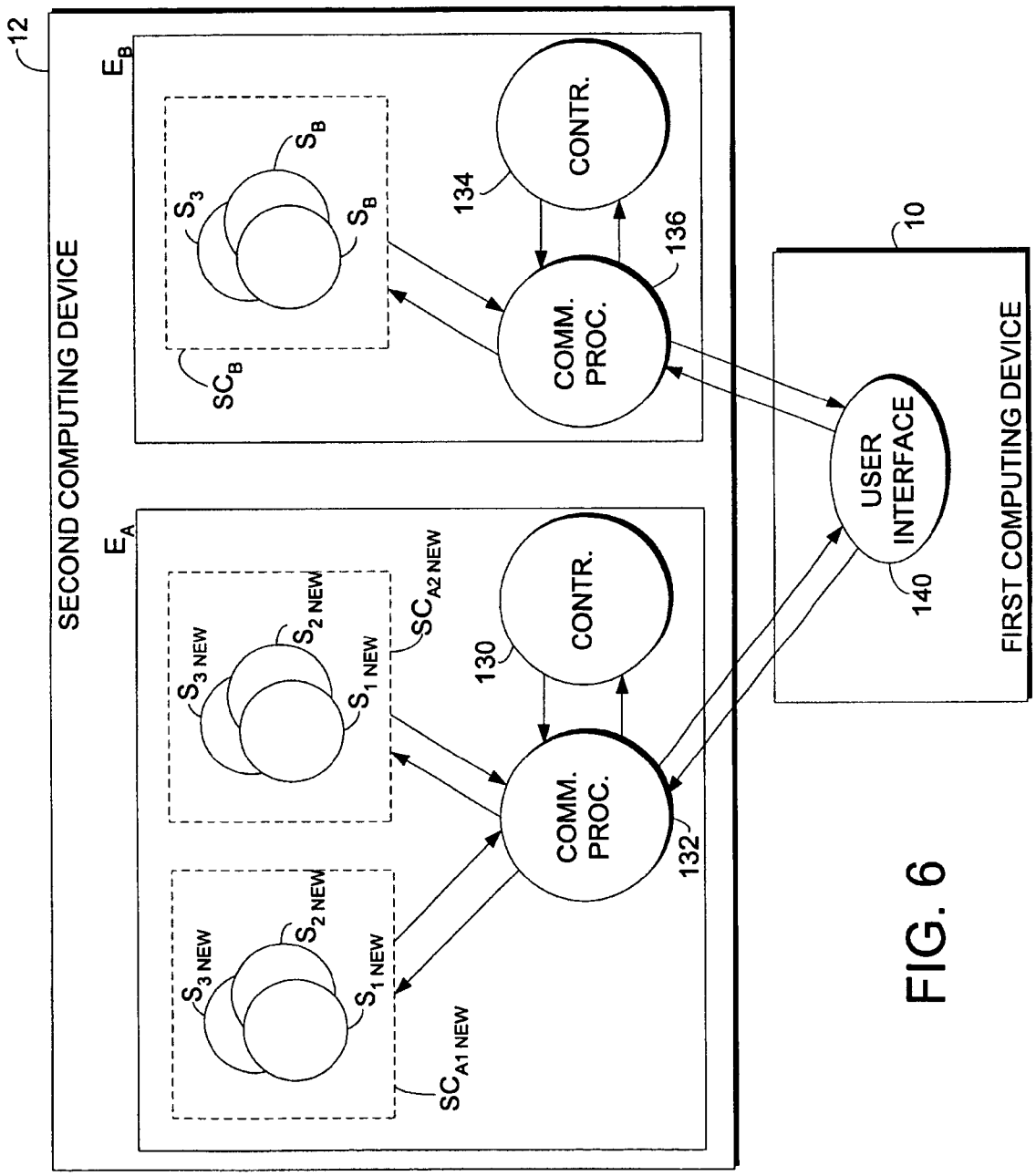
FIG. 6 shows the step in the process of the present invention in which new server classes are added in the environment.

Next, the scripts issue a second command which it removes all of the existing server class definitions from the environment. This command, like the first, travels through communications processor 132 where it is received by controller 130. Controller 130 then executes the removal of all of the server class definitions. This effectively deletes the server classes, as may be seen in FIG. 5, from the environment. FIG. 5 shows server class $SC_A$ being deleted in this process. Though not pictured herein, any other server classes in environment $E_A$ would also be deleted by this process.

The scripts then transmit a third command which adds the new server class definitions. These definitions are contained in environmental configuration file 202, and are used to configure the new server classes. The construction of two new server classes—$SC_{A1\ NEW}$ and $SC_{A2\ NEW}$ may be seen in FIG. 6, each including newly created servers $S_{1\ NEW}$, $S_{2\ NEW}$, and $S_{3\ NEW}$.

Finally, a fourth command is issued from the scripts that starts the new server classes and servers therein to thus start the application.

By this process, the environment is merged with the new objects to create a series of server class configurations that define the behavior of the application.

Once the build is complete, an output file may be transmitted back to the first computing device via the command line of communications. Maker 26 issues this file back through the command message station 30, over TCP/IP socket 32 to be received by proxy server 28. Once received and maintained in proxy server 28, this file will be drawn out by batch commands issued by the batch process 18, and communicated to the project manager, or other user by way of email using build reporter 38. The file is then saved by the build manager.

As can be seen, the present invention and its equivalents are well-adapted to provide a new and useful method of creating a build from a first computing device having a version control system therein, onto a second computing device. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

Set forth below are embodiments of the object and environmental XML files as discussed above.

The invention claimed is:

1. A method of building an application having one or more versions, said method including the steps of:
   providing a first computing device;
   providing a second computing device having a controlling process for an environment, said environment having parameters, said controlling process managing at least one group of servers in said environment;
   selecting at least one file directed to a selectable version of said application from said one or more versions using said first computing device for the purpose of building the selectable version of the application on said second computing device;
   deleting said at least one group of servers which are associated with the application using said controlling process wherein said deleting step comprises the additional step of: including as said at least one file, an environmental-configuration file, which includes a plurality of environmental configurations for the parameters of the controlling process environment;
   creating at least one new server group in the environment; and
   building said selectable version of said application on said second computing device.

2. The method of claim 1 including the step of:
   using said environmental-configuration file to message the controller to accomplish the deleting step.

3. The method of claim 1 including the step of:
   including scripts within said environmental-configuration file;
   using said scripts to message the controller to accomplish the deleting step.

4. The method of claim 3 comprising the additional step of:
   using said scripts to configure new server groups in the environment.

5. The method of claim 3 comprising the additional step of:
   providing a command interface for enabling said scripts to message said controller.

6. The method of claim 5 comprising:
selecting Pathcom™ as the command interface which is provided for enabling said scripts to message said controller.

7. The method of claim 1 comprising:
providing a scheduler;
creating a build schedule using said scheduler;
repeating the selecting, deleting, and building steps according to said build schedule.

8. The method of claim 7 including the step of:
creating said build schedule such that the selecting locating, deleting, and building steps to occur daily.

9. The method of claim 1 comprising:
enabling the selecting locating, deleting, and building steps to occur on-demand.

10. The method of claim 1 including the additional steps of:
checking said selectable version of said application into a version control system;
associating the selectable version with a tag; and
referencing said selectable version in a version control system using said tag in order to accomplish said selecting step.

11. The method of claim 1 comprising:
including in said selectable version of the application an environmental-configuration containing XML file.

12. The method of claim 11 comprising:
including in said selectable version of the application an object-XML file.

13. The method of claim 12 comprising:
including with said selectable version of said application a plurality of XSL files.

14. One or more computer-storage media having computer-executable instructions embodied thereon to perform a method comprising: providing a first file that substantially includes only the parameters for configuration of an application that do no depend upon a specific environment; providing a second file that substantially includes only the parameters for configuration of said application that are environment-specific wherein said first and second files are accessed by a first computing device to enable the building of an application on a second computing device, wherein building an application includes the step of deleting said at least one group of servers which are associated with the application using said controlling process including as said at least one file, an environmental-configuration file, which includes a plurality of environmental configurations for the parameters of the controlling process environment.

15. The computer-storage media of claim 14 in which said first and second files are XML files.

16. The computer-storage media of claim 14 in which the second file further comprises:
a label for identifying an environment into which the application is to be run;
a group of environmental parameters which are specific to the environment, but not specific to the application; and
a group of application parameters which are specific to the environment.

17. The computer-storage media of claim 16 in which said second file further comprises:
a number of parameters specific to at least one server.

18. The computer-storage media of claim 17, further comprising:
a set of scripts that accept the first and second files as inputs to create output files that are useable in the second computing device.

19. The computer-storage media of claim 14 in which the environmental requirements of an environment in the second computing device may be configured by editing said second file in said first computing device making the application dynamically adaptable to multiple environments in the second computing device.

20. One or more computer-storage media having computer-executable instructions embodied thereon for performing a method of building an application, said method comprising: providing a first file first file that substantially includes only the parameters for configuration of an application that do no depend upon a specific environment; providing a second file that substantially includes only the parameters for configuration of said application that are environment; a first computing device utilizing said first and second files to access selectable files to enable the building an application on a second device, wherein building an application includes the step of deleting said at least one group of servers which are associated with the application using said controlling process, including as said at least one file, an environmental-configuration file, which includes a plurality of environmental configurations for the parameters of the controlling process environment.

21. The computer-storage media of claim 20, further comprising:
creating said first and second files in XML.

22. The computer-storage media of claim 21, further comprising:
identifying an environment into which the application is to be run using a label;
including a group of environmental parameters in said second file which are specific to the environment, but not specific to the application; and
including a group of application parameters in said second file which are specific to the environment.

23. The computer-storage media of claim 22, further comprising:
including a number of parameters specific to at least one server in said second file.

24. The computer-storage media of claim 23, further comprising:
including in said second file a script that accepts the first and second files as inputs to create output files that are useable in the second computing device.

25. The computer-storage media of claim 20, further comprising:
dynamically adapting the application to multiple environments in said second computing device by editing said second file.

* * * * *